US010156695B2

(12) United States Patent
Yamaguchi

(10) Patent No.: US 10,156,695 B2
(45) Date of Patent: Dec. 18, 2018

(54) IMAGE PROCESSING APPARATUS AND IMAGE PROCESSING METHOD

(71) Applicant: CANON KABUSHIKI KAISHA, Tokyo (JP)

(72) Inventor: Shota Yamaguchi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/628,147

(22) Filed: Jun. 20, 2017

(65) Prior Publication Data
US 2017/0371129 A1    Dec. 28, 2017

(30) Foreign Application Priority Data

Jun. 28, 2016   (JP) ................. 2016-127850

(51) Int. Cl.
| | |
|---|---|
| H04N 1/04 | (2006.01) |
| G02B 7/36 | (2006.01) |
| G02B 27/00 | (2006.01) |
| H04N 21/431 | (2011.01) |
| H04N 5/232 | (2006.01) |

(52) U.S. Cl.
CPC ........... *G02B 7/36* (2013.01); *G02B 27/0075* (2013.01); *H04N 21/4312* (2013.01); *H04N 5/23212* (2013.01); *H04N 5/23293* (2013.01)

(58) Field of Classification Search
CPC .. H04N 21/4223; H04N 1/00167; H04N 1/04; H04N 2201/0414; H04N 2201/0416; G02B 13/14; G02B 21/0012; G02B 21/16; G02B 21/22; G02B 21/34; G02B 21/365; G02B 21/367; G02B 21/368; G02B 27/0172; G02B 7/001; G06F 17/156; G06F 3/03545; G06F 3/04845; G06F 3/0488
USPC ....... 382/299, 103, 300, 132, 141, 167, 266, 382/278, 298, 107, 162, 173, 182, 190, 382/192, 209, 210, 215, 218, 236, 254, 382/260, 261, 264, 269, 272, 275, 280, 382/284; 358/474, 448
See application file for complete search history.

(56) References Cited

U.S. PATENT DOCUMENTS

| | | | | |
|---|---|---|---|---|
| 5,321,525 | A * | 6/1994 | Hains | H04N 1/4055 358/3.01 |
| 5,696,596 | A * | 12/1997 | Taniguchi | H04N 1/00201 347/112 |
| 6,314,198 | B1 * | 11/2001 | Ogura | G06T 5/007 382/132 |
| 6,654,060 | B1 * | 11/2003 | Kurosawa | H04N 5/23203 348/14.04 |
| 9,594,971 | B1 * | 3/2017 | Wilbert | G06K 9/325 |

(Continued)

FOREIGN PATENT DOCUMENTS

JP    2009-111635 A    5/2009

*Primary Examiner* — Negussie Worku
(74) *Attorney, Agent, or Firm* — Carter, Deluca, Farrell & Schmidt LLP

(57) ABSTRACT

An image processing apparatus includes: an image acquisition unit configured to acquire a plurality of images having different depths of field for an object; a designation unit configured to instruct a user to designate an area of the object; a presentation unit configured to present at least two candidate images from the plurality of images based on the depths of field and an object distance of the area; and a selection unit configured to instruct the user to select an image from the candidate images.

9 Claims, 14 Drawing Sheets

(56) References Cited

U.S. PATENT DOCUMENTS

| | | | |
|---|---|---|---|
| 2010/0030515 A1* | 2/2010 | Kludas | G01B 11/24 |
| | | | 702/159 |
| 2012/0218515 A1* | 8/2012 | Imamura | A61B 3/12 |
| | | | 351/206 |
| 2012/0268552 A1* | 10/2012 | Choi | H04N 7/147 |
| | | | 348/14.07 |
| 2018/0097988 A1* | 4/2018 | Tsuchiya | G03B 7/091 |
| 2018/0137119 A1* | 5/2018 | Li | G06F 17/30268 |
| 2018/0182110 A1* | 6/2018 | Shintani | G06T 7/248 |

* cited by examiner

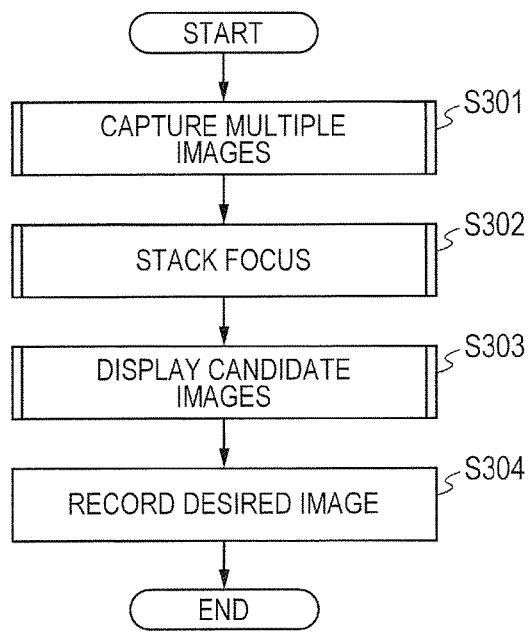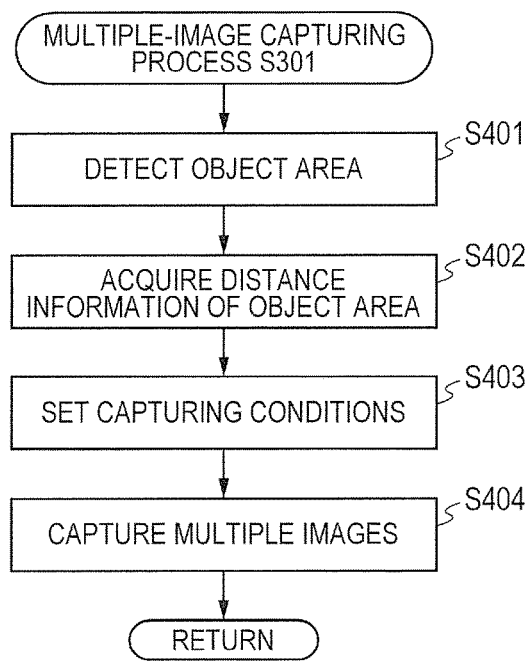

| IMAGE NUMBER | DEPTH OF FIELD | |
|---|---|---|
| | MINIMUM OBJECT DISTANCE | MAXIMUM OBJECT DISTANCE |
| 1 | Zmin | z1 |
| 2 | Z1 | z2 |
| 3 | Z2 | z3 |
| 4 | Z3 | Zmax |
| 5 | Zmin | Zmax |
| 6 | Zmin | Zmax |

DESIRED IMAGE A

DESIRED IMAGE B

IMAGE FOR ACCEPTING DESIGNATION

IMAGE PROCESSING APPARATUS AND IMAGE PROCESSING METHOD

BACKGROUND OF THE INVENTION

Field of the Invention

The present invention relates to an image processing apparatus and an image processing method, in particular, to an image processing apparatus and an image processing method that can obtain an image that is in focus at a user-desired area.

Description of the Related Art

Conventionally, focus bracketing capturing that continuously performs capturing while changing a focus position is known. A use of focus bracketing capturing allows for acquisition of multiple images that are in focus at different areas for an object.

Japanese Patent Application Laid-open No. 2009-111635 discloses an imaging apparatus that performs focus bracketing capturing. This imaging apparatus selects an image which is best focused at an area designated by a user from a plurality of images obtained by focus bracketing capturing.

In the technique disclosed in Japanese Patent Application Laid-open No. 2009-111635, however, there is a problem that it is not always possible to acquire a user-desired image. For example, when a plurality of images having different depths of field are acquired, there may be a plurality of relevant images that are in focus at a user-designated area. In such a case, it is difficult to determine an image of which depth of field the user desires among the selected images.

SUMMARY OF THE INVENTION

An image processing apparatus according to one embodiment of the present invention includes: an image acquisition unit configured to acquire a plurality of images having different depths of field for an object; a designation unit configured to instruct a user to designate an area of the object; a presentation unit configured to present at least two candidate images from the plurality of images based on the depths of field and an object distance of the area; and a selection unit configured to instruct the user to select an image from the candidate images.

An image processing method according to one embodiment of the present invention includes: acquiring a plurality of images having different depths of field for an object; determining an image for instructing a user to designate an area of the object; presenting at least two candidate images from the plurality of images based on the depths of field and an object distance of the area; and determining an image selected by the user from the candidate images.

Further features of the present invention will become apparent from the following description of exemplary embodiments with reference to the attached drawings.

BRIEF DESCRIPTION OF THE DRAWINGS

FIG. 3 is a flowchart illustrating an outline of an image processing method according to the first embodiment.

FIG. 4 is a flowchart of a multiple-image capturing process according to the first embodiment.

DESCRIPTION OF THE EMBODIMENTS

Preferred embodiments of the present invention will now be described in detail in accordance with the accompanying drawings.

First Embodiment

An image processing apparatus of the first embodiment can present and record, from a plurality of images having different depths of field, an image which is in focus at a position designated by a user. In the following description, a capturing mode in an image processing of the present embodiment is referred to as a focus position designation mode.

Figure 1:
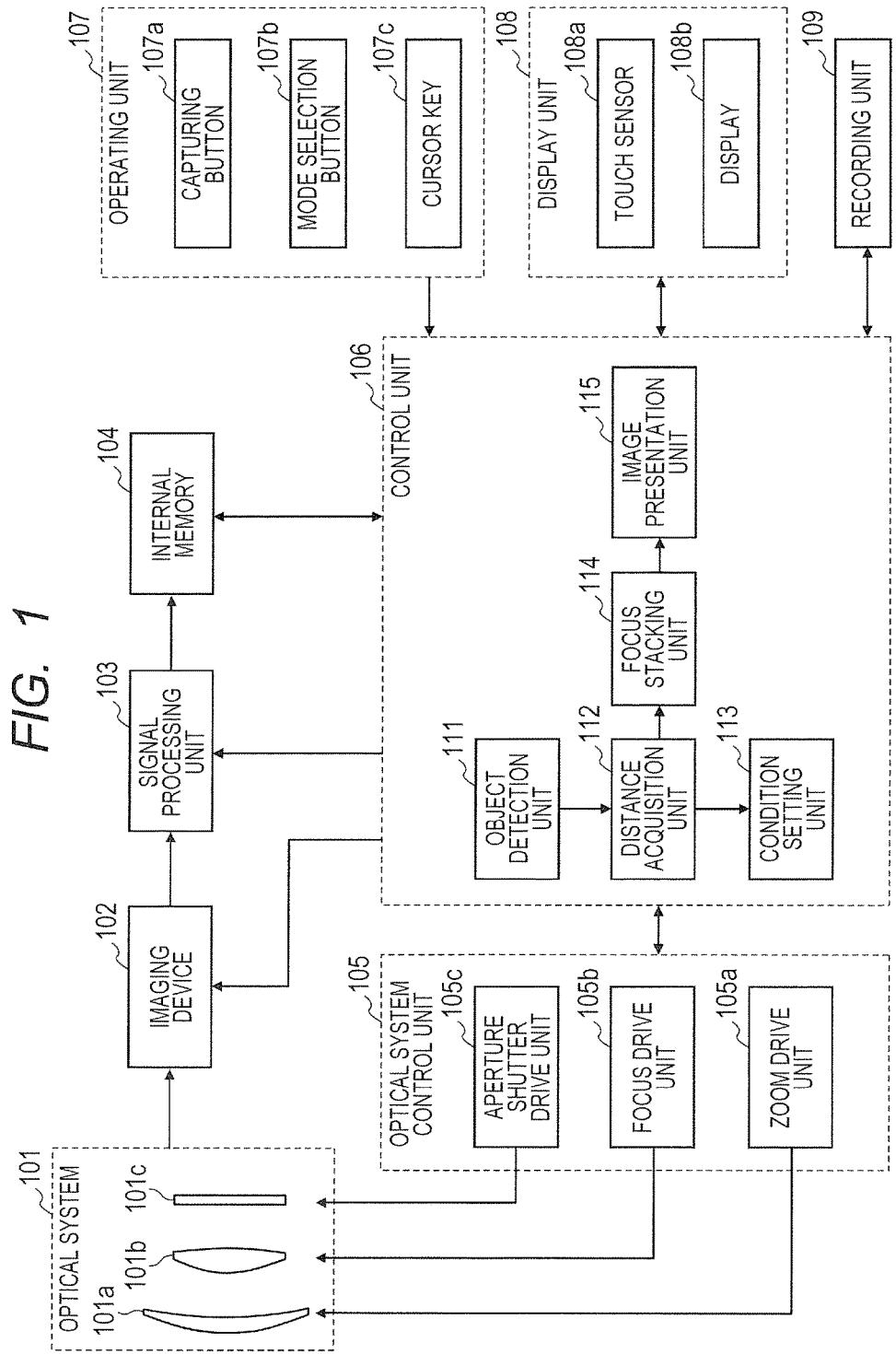
FIG. 1 is a block diagram of an imaging apparatus according to a first embodiment.

FIG. 1 is a block diagram of an image processing apparatus according to the present embodiment. The image processing apparatus comprises an optical system 101, a imaging device 102, a signal processing unit 103, an internal memory 104, an optical system control unit 105, a control unit 106, an operating unit 107, a display unit 108, and a recording unit 109.

The optical system 101 comprises a zoom lens 101a, a focus lens 101b, and an aperture shutter 101c. The optical system 101 captures a light from an object on a capturing surface of the imaging device 102 to form an object image. The zoom lens 101a, the focus lens 101b, and the aperture shutter 101c are controlled by the optical system control unit 105 to adjust a magnification, a focus position, and a light amount of an object image reaching the imaging device 102, respectively.

The imaging device 102 is a photoelectric conversion device such as a charge coupled device (CCD), a complementary MOS (CMOS) sensor, or the like. The imaging device 102 photoelectrically converts a light flux of an object that has passed through the optical system 101 and inputs the converted light flux to the signal processing unit 103 as an analog image signal.

The signal processing unit 103 includes an analog-to-digital conversion circuit that converts an input analog image signal into a digital image signal. The signal processing unit 103 applies predetermined image processing such as white balance adjustment, interpolation, edge enhancement, gamma correction, gradation conversion, or the like to the digital image signal. The analog-to-digital conversion circuit may be provided to the imaging device 102.

The internal memory 104 includes a dynamic random access memory (DRAM) or the like and temporarily stores an image from the signal processing unit 103 therein. Further, the internal memory 104 is used by the control unit 106 as a load area from which a control program is read out or a work area when various processes are performed.

The optical system control unit 105 comprises a zoom drive unit 105a, a focus drive unit 105b, and an aperture shutter drive unit 105c. The optical system control unit 105 controls drive amounts, drive timings, or the like of the zoom drive unit 105a, the focus drive unit 105b, and the aperture shutter drive unit 105c based on the capturing condition from the control unit 106. The zoom drive unit 105a and the focus drive unit 105b move the zoom lens 101a and the focus lens 101b, respectively, along the optical axis. The aperture shutter drive unit 105c changes the opening size of the aperture shutter 101c.

The control unit 106 includes a central processing unit (CPU) or the like and, based on an instruction from the operating unit 107, transmits control signals to respective units such as the imaging device 102, the signal processing unit 103, the optical system control unit 105, and the like of the image processing apparatus. The control unit 106 comprises an object detection unit 111, a distance acquisition unit 112, a condition setting unit 113, a focus stacking unit 114, and an image presentation unit 115 and functions as an image acquisition unit, a designation unit, a presentation unit, and a selection unit.

The object detection unit 111 detects an object area of an acquired image. The distance acquisition unit 112 acquires distance information of an object area, for example, an imaging device-to-object distance. The condition setting unit 113 sets capturing conditions when capturing an object based on the distance information. The focus stacking unit 114 performs a focus stacking process. The focus stacking process is a process of combining a plurality of images each having a small depth of field to generate one image having a great depth of field. The image presentation unit 115 determines an object area designated by a user, based on an input signal from the operating unit 107 or the display unit 108. The image presentation unit 115 selects an image from a plurality of images having different depths of field based on distance information of the determined object area and presents the selected image to the user.

The operating unit 107 comprises various operating devices such as a capturing button 107a, a mode selection button 107b, a cursor key 107c, and the like. The operating unit 107 is a unit by which a user instructs the image processing apparatus and inputs, to the control unit 106, a signal in accordance with a user operation. The user can designate any area of an image displayed on the display unit 108 by operating the cursor key 107c, for example. The operating unit 107 may include a touch sensor 108a of the display unit 108. The mode selection button 107b has a function of selecting an image selection mode related to selection of captured images in addition to selecting a capturing mode related to the capturing conditions. In the present embodiment, the image selection mode may include a mode for selecting a desired image (focus position designation mode) by presenting candidate images based on the depth of field and the designated focus position.

The display unit 108 comprises the touch sensor 108a, a display 108b, and the like. The touch sensor 108a is provided on the display 108b and includes transparent electrodes aligned in a matrix. The static capacitance at the electrodes varies in response to a user's touch operation, that is, a user's finger coming into contact with the touch sensor 108a. This enables the touch sensor 108a to detect the contact position of the finger and the trace thereof. The touch sensor 108a inputs a signal in accordance with such a touch operation into the control unit 106. The display 108b includes a liquid crystal display or an organic electro luminescence (EL) display, for example, and displays an image generated by the signal processing unit 103, an image read out from the internal memory 104 or the recording unit 109, various setting information, or the like.

The recording unit 109 is an information recording medium such as a semiconductor memory, a magneto-optic disk, or the like and records images or the like output from the control unit 106 therein. The recording unit 109 may be configured to be removable, or may record therein an image generated by an external device. The image processing apparatus may have a communication unit to connect to a network and can transmit or receive an image to or from a server on the network via the communication unit.

Figure 2:
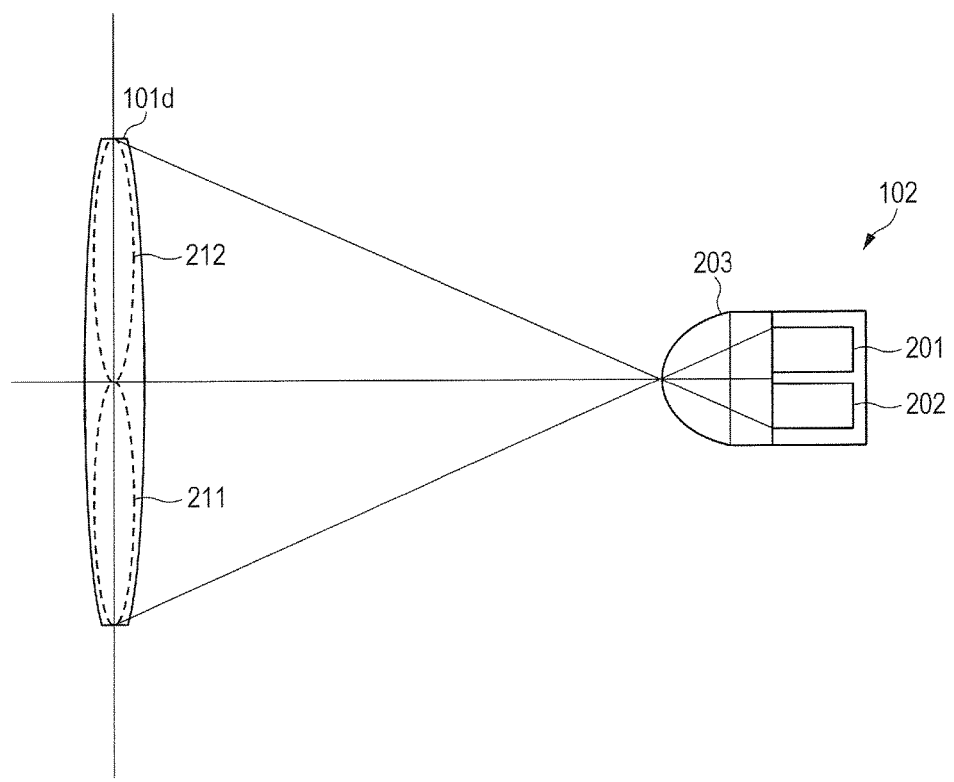
FIG. 2 is a schematic diagram of a imaging device according to the first embodiment.

FIG. 2 is a schematic diagram of the imaging device 102 according to the present embodiment. FIG. 2 depicts the optical system 101 and the imaging device 102 from a direction orthogonal to the optical axis. For the purpose of depiction, an exit pupil 101d of the optical system 101 and one pixel of the imaging device 102 only are depicted. Each pixel of the imaging device 102 comprises equally divided sub-pixels 201 and 202. Each of the sub-pixels 201 and 202 includes one photodiode. A micro lens 203 is formed on the light receiving side in each pixel of the imaging device 102. Lights from an object that have passed through different pupil areas 211 and 212 of the exit pupil 101d enter the corresponding sub-pixels 201 and 202 via the micro lens 203, respectively.

FIG. 3 is a flowchart illustrating an outline of an image processing method of the present embodiment. First, the user operates the mode selection button 107b to select the focus position designation mode. Subsequently, in response to the user pressing the capturing button 107a, at step S301, the control unit 106 captures a plurality of images while changing the focus position. That is, the control unit 106 acquires distance information of an object area detected as an object and, based on the distance information, performs bracketing capturing while changing a focus position. The plurality of captured images are temporarily held in the internal memory 104.

At step S302, the control unit 106 focus-stacks the plurality of captured images to generate an image having a great depth of filed. The control unit 106 combines a plurality of images having different focus positions to generate an image having a great depth of field. The generated image is temporarily held in the internal memory 104.

At step S303, the control unit 106 displays candidate images. The control unit 106 selects, from the images obtained by the preceding processes, at least two candidate images that are estimated to be close to the user's intention and displays the selected candidate images on the display unit 108. For example, in response to the user designating some area of an image on the display unit 108, the control unit 106 displays at least two images from the plurality of captured images, based on the object distance of the depth of field and the designated area. The user selects one desired image from the images displayed on the display unit 108.

At step S304, the control unit 106 determines the image selected by the user and records the determined image in the recording unit 109. The control unit 106 deletes, from the internal memory 104, other images than the selected image.

FIG. 4 is a detailed flowchart of the image capturing process (S301) of FIG. 3. First, at step S401, the object detection unit 111 of the control unit 106 detects an object area in an acquired image. FIG. 5A illustrates an example of an object area. The object detection unit 111 divides an image 501 into a plurality of blocks 501a and acquires brightness and color information of each block. Next, the object detection unit 111 detects, as an object area 502, a set of blocks having information similar to information of a block which belongs to the center portion of the image 501. A detection method of an object area is not limited in particular and may be a method of detecting an object area by extracting a feature value regarding brightness, color, contrast distribution, or the like from an image and then comparing the feature value with a pre-modeled feature value, for example.

Next, at step S402, the distance acquisition unit 112 of the control unit 106 acquires distance information of the object area 502. The distance information includes a distance from the optical system 101 to the object at capturing, that is, an object distance. The process of step S402 will be described in detail by using FIG. 6 and FIG. 5B.

Figure 6:
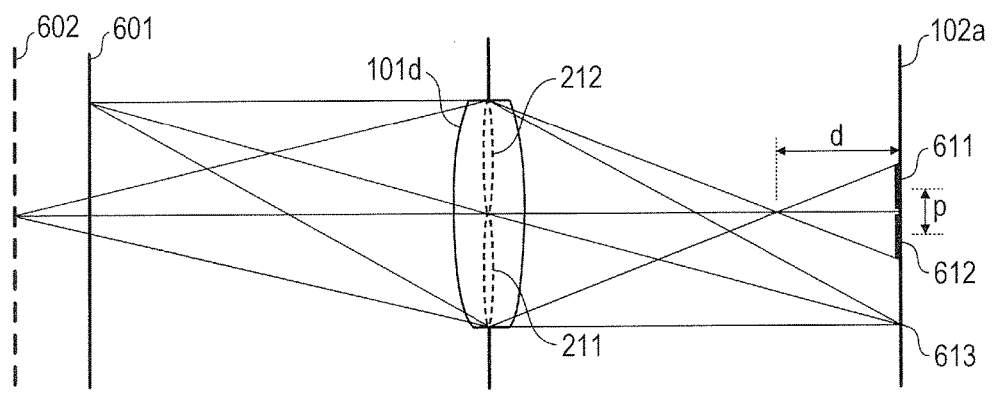
FIG. 6 is a diagram illustrating an acquisition method of distance information according to the first embodiment.

FIG. 6 is a diagram illustrating an acquisition method of distance information according to the present embodiment. FIG. 6 illustrates an optical positional relationship between the exit pupil 101d of the optical system 101 and a capturing surface 102a of the imaging device 102 when an object is present at positions 601 and 602. An object located at the position 601 is in focus, and light fluxes from the object that have passed through the different pupil areas 211 and 212 are captured on the same position 613 on the capturing surface 102a. On the other hand, an object located at the position 602 is out of focus. In this case, light fluxes that have passed through the different pupil areas 211 and 212 extend to widths 611 and 612 on the capturing surface 102a, respectively, resulting in a blurred object image. The distance acquisition unit 112 converts displacement amount p of these object images into defocus amount d and calculates the object distance based on lens information of the optical system 101. An acquisition method of the object distance is not limited in particular and may be a method of measuring the object distance by a ranging sensor utilizing infrared rays or the like, for example.

Figure 5B:
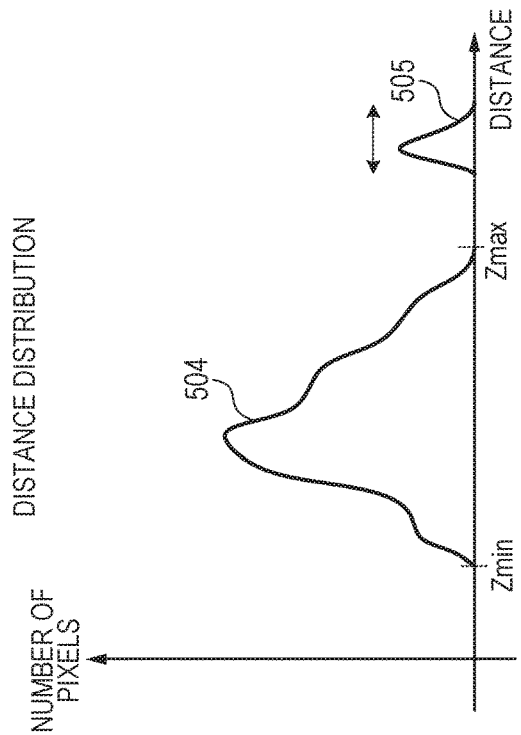
FIG. 5B is a diagram illustrating an example of a distance distribution according to the first embodiment.
Figure 5A:
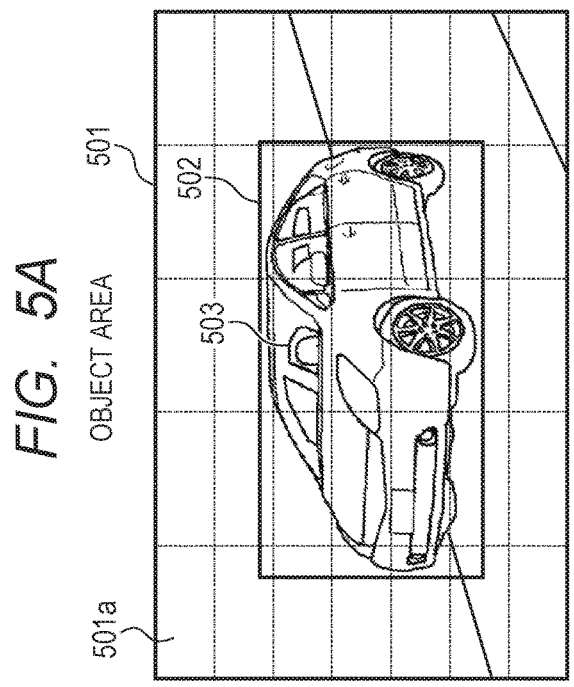
FIG. 5A is a diagram illustrating an example of an object area according to the first embodiment.

FIG. 5B is an example of a distance distribution of the object area 502 according to the present embodiment. The horizontal axis of the graph represents the object distance of each pixel, and the vertical axis represents the number of pixels. The distance acquisition unit 112 creates a distance distribution illustrated in FIG. 5B for the object area 502. The distance acquisition unit 112 determines a distribution 504 including the peak of frequency as the distance information of an object 503 and acquires the minimum distance Zmin and the maximum distance Zmax. A distribution 505 located away from the peak indicates distance information of a background area mixed into the object area 502 and therefore is excluded.

Next, at steps S403 and S404, the condition setting unit 113 of the control unit 106 sets capturing conditions and captures a plurality of images. The capturing conditions include the position of the focus lens 101b, the aperture value of the aperture shutter 101c, and the like. The processes of step S403 and step S404 will be described in detail by using FIG. 7.

Figure 7:
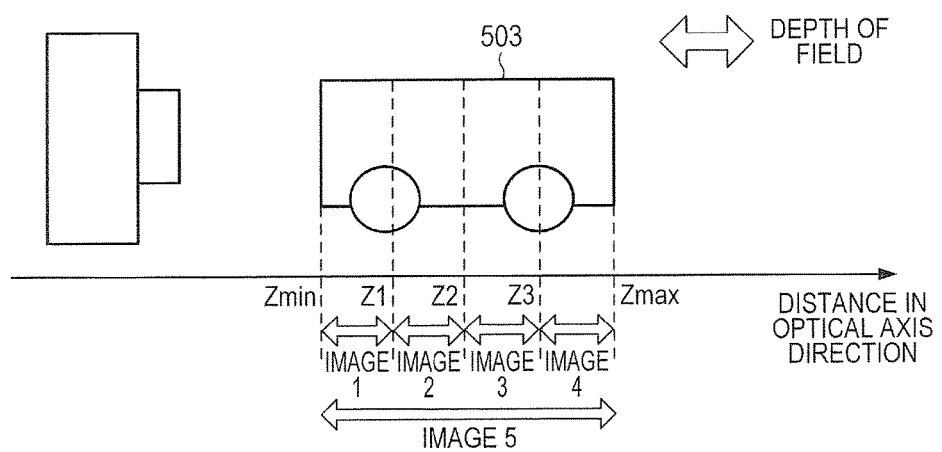
FIG. 7 is a diagram illustrating a capturing method according to the first embodiment.

FIG. 7 is a diagram illustrating a capturing method according to the present embodiment. As acquired at step S402, the object distance of the object 503 ranges from the distance Zmin to the distance Zmax. First, the condition setting unit 113 sets capturing conditions for performing focus bracketing capturing. For example, the condition setting unit 113 divides the object 503 into four areas in the order of distance and sets an aperture value of the aperture shutter 101c such that each area is included in the depth of field by one time of capturing. The condition setting unit 113 then sets a bracketing width, that is, a position at each capturing of the focus lens 101b in accordance with the depth of field.

Furthermore, the condition setting unit 113 sets capturing conditions for capturing an image having a great depth of field. For example, the condition setting unit 113 sets an aperture value of the aperture shutter 101c and a position of the focus lens 101b such that the entire object 503 is included in the depth of field by one time of capturing. That is, the condition setting unit 113 sets a larger aperture value than that of the capturing conditions for focus bracketing capturing.

Subsequently, the control unit 106 transmits the capturing conditions to the optical system control unit 105. The optical system control unit 105 drives the focus drive unit 105b based on the capturing conditions and performs four-step bracketing on the position of the focus lens 101b along the optical axis. The control unit 106 controls the imaging device 102 and the signal processing unit 103 to sequentially perform capturing at each bracketing position. Thereby, four images from an image 1 having a depth of field of the distance Zmin to a distance Z1 to an image 4 having a depth of field of a distance Z3 to the distance Zmax are acquired.

Furthermore, the optical system control unit 105 drives the focus drive unit 105b and the aperture shutter drive unit 105c based on the capturing conditions to adjust the position of the focus lens 101b and the aperture value of the aperture shutter 101c. The control unit 106 controls the imaging device 102 and the signal processing unit 103 to capture one image. Thereby, an image 5 having a depth of field of the distance Zmin to the distance Zmax is acquired.

Figure 8:
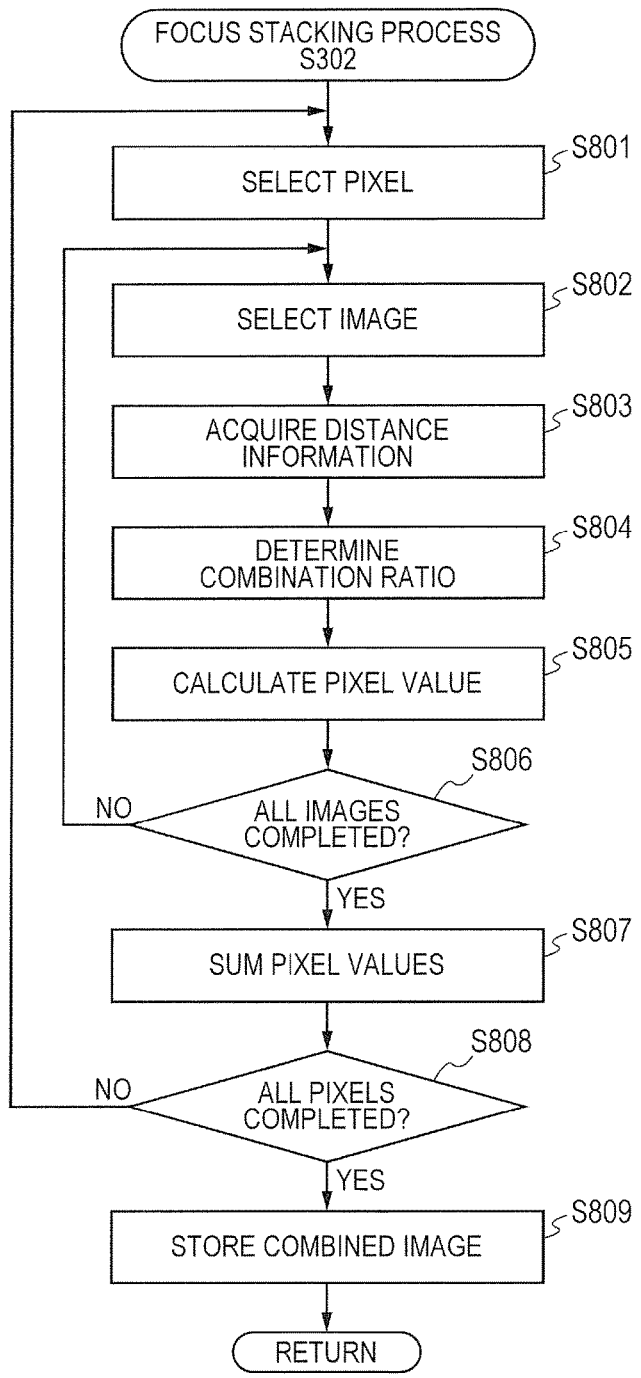
FIG. 8 is a flowchart of a focus stacking process according to the first embodiment.

FIG. 8 is a detailed flowchart of the focus stacking process (S302) of FIG. 3. In the focus stacking process, the images 1 to 4 acquired by multiple times of image capturing are combined and thereby an image 6 is generated. First, at step S801, the focus stacking unit 114 of the control unit 106 selects one pixel to be processed. The order of selection of pixels may be an order from the end of an image, for example, and is not limited in particular.

At step S802, the focus stacking unit 114 selects one image from the images 1 to 4. The order of selection of images may be an ascending order of the number from the image 1, for example, and is not limited in particular. At step S803, the focus stacking unit 114 acquires, from the distance acquisition unit 112, the object distance of a target pixel in the selected image.

Figures 9, 10:
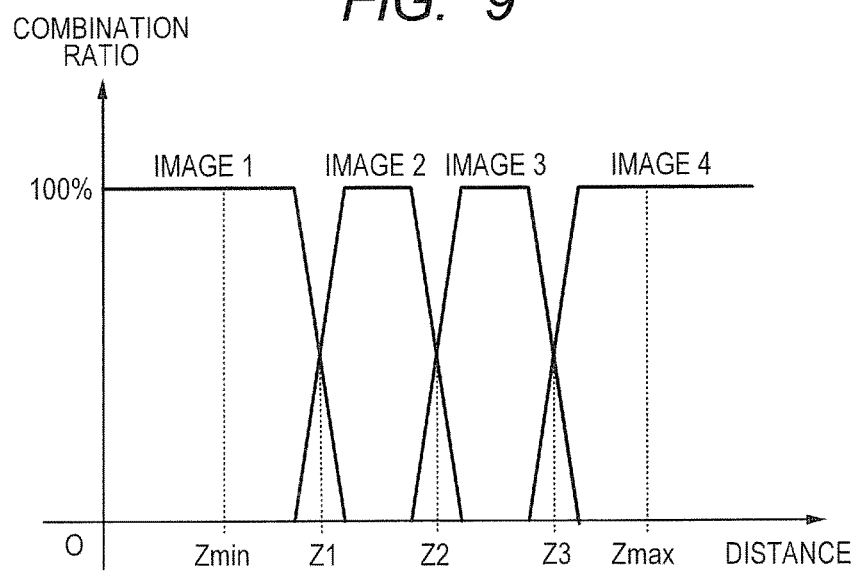
FIG. 9 is a graph illustrating an example of a combination ratio at focus-stacking according to the first embodiment.
FIG. 10 is a table of depth information of an image according to the first embodiment.

At step S804, the focus stacking unit 114 determines a combination ratio of target pixels in accordance with the object distance. As illustrated in FIG. 9, the focus stacking unit 114 sets a higher combination ratio for the pixel included in the depth of field. For example, when the image 2 is selected, the combination ratio of the pixel included in the depth of field of the image 2 (Z1 to Z2) is set hither.

At step S805, the focus stacking unit 114 calculates a combined pixel value by multiplying the original pixel value by the combination ratio. At step S806, the focus stacking unit 114 determines whether or not calculation of combined pixel values has been completed for all the images (images 1 to 4). When there is an image where no combined pixel value has been calculated, the focus stacking unit 114 returns to step S802 and selects a next image.

At step S807, the focus stacking unit 114 sums the combined pixel values of the images 1 to 4 to derive the pixel value of the image 6. At step S808, the focus stacking unit 114 determines whether or not the pixel value of the image 6 has been obtained for all the pixels. When there is a pixel where no pixel value has been obtained, the focus stacking unit 114 returns to step S801 and selects a next pixel.

At step S809, the focus stacking unit 114 stores the image 6 in the internal memory 104. Furthermore, the focus stacking unit 114 stores the depth information of the six images from the image 1 to the image 6 obtained by the preceding processes in the internal memory 104. The focus stacking unit 114 may store each image and the depth information thereof in the recording unit 109.

FIG. 10 is a table of depth information of images according to the present embodiment. The depth information includes the maximum value and the minimum value of the object distance within the depth of field of each image. In the present embodiment, the image 5 and the image 6 have the same depth of field. Since the image 5 is captured with a reduced aperture, the camera shake amount and the SN ratio of the image 5 are worse than those of the image 6, and the degree of background blur of the image 5 is small. On the other hand, the image quality of the image 6 is likely to be deteriorated due to a combining process.

Figure 11:
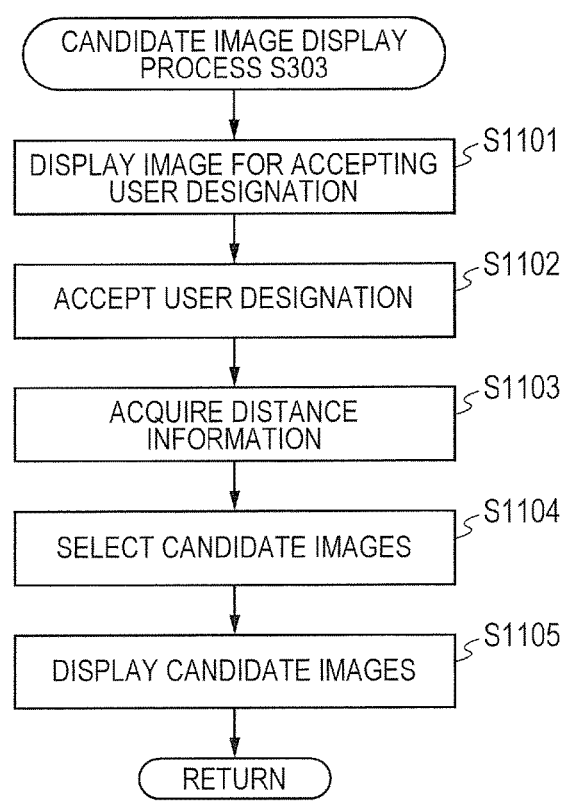
FIG. 11 is a flowchart of a candidate image display process according to the first embodiment.
Figure 12A:
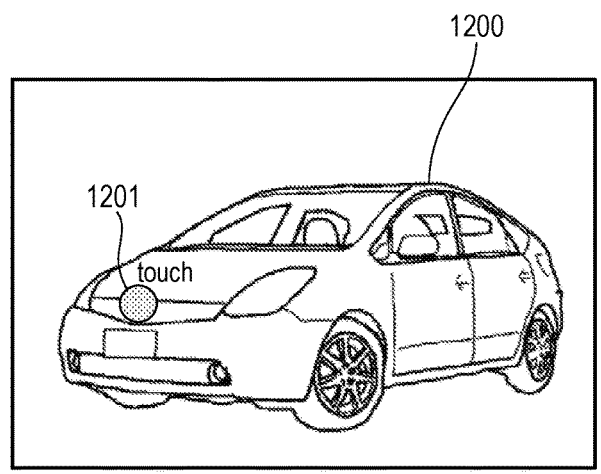
FIG. 12A is a schematic diagram illustrating a touch point according to the first embodiment.

FIG. 11 is a flowchart of a candidate image display process (S303) of FIG. 3. First, at step S1101, the image presentation unit 115 of the control unit 106 displays an image for accepting designation as illustrated in FIG. 12A on the display unit 108. In the focus position designation mode, in order to prompt a user to touch a position to be focused, it is preferable for the image for accepting designation to be an image having a high visibility over the entire image. Therefore, the image presentation unit 115 employs the image 5 or the image 6 having a great depth of field as the image for accepting designation.

At step S1102, the image presentation unit 115 accepts designation from a user. For example, when the front portion of an automobile 1200 is touched by the user as illustrated in FIG. 12A, the image presentation unit 115 receives coordinates of a touch point 1201 from the touch sensor 108a.

At step S1103, the image presentation unit 115 acquires the distance information of the touch point 1201. Specifically, the image presentation unit 115 acquires the depth of field of a pixel at the touch point 1201 from the distance acquisition unit 112. Further, when the touch point 1201 ranges over a plurality of pixels, the image presentation unit 115 takes the average value of the object distances of the plurality of pixels.

Figure 12B:
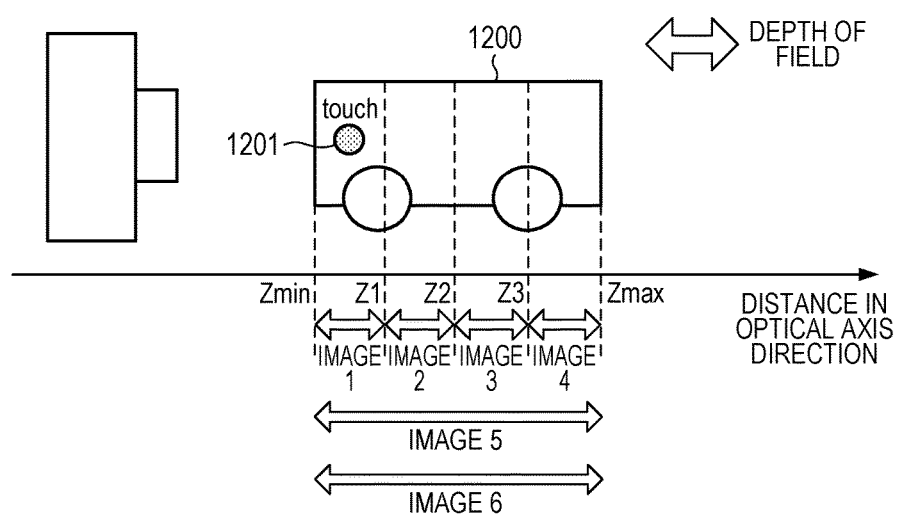
FIG. 12B is a schematic diagram illustrating a relationship between a touch point and candidate images according to the first embodiment.

At step S1104, the image presentation unit 115 selects candidate images based on the distance information. When the object distance of the touch point 1201 is denoted as Zt, the distance Zt is between the distance Zmin and the distance Z1 (Zmin≤Zt≤Z1) in the example of FIG. 12B. Therefore, image presentation unit 115 selects all the images which include the distance Zt in the depth of field from the images 1 to 6. That is, the image presentation unit 115 selects the image 1, the image 5, and the image 6 as candidate images as the example of FIG. 12B. Note that, when the distance Zt is less than the distance Zmin or greater than the distance Zmax, the image presentation unit 115 may display an alarm display to the user on the display unit 108. Alternatively, instead of an alarm display or in addition to an alarm display, the image presentation unit 115 may select the image 5 having the least relative background blur in the images 1 to 6.

Figure 13:
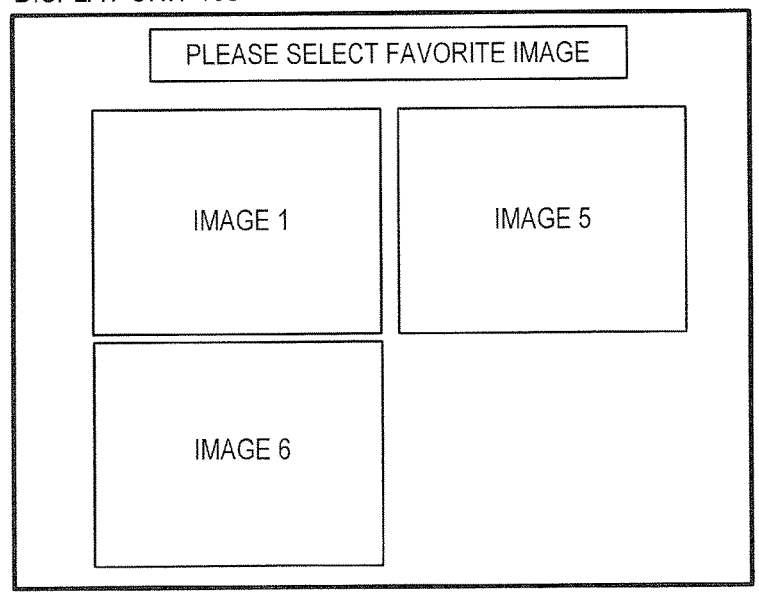
FIG. 13 is a diagram illustrating an example of a display of candidate images according to the first embodiment.

At step S1105, the image presentation unit 115 displays the selected candidate images on the display unit 108. When selecting the image 1, the image 5, and the image 6 as the candidate images, the image presentation unit 115 arranges and displays the selected three images on the display unit 108 as illustrated in FIG. 13. Further, the image presentation unit 115 displays, on the display unit 108, a display for prompting the user to select a favorite image together with the candidate images.

As discussed above, according to the present embodiment, a plurality of images having different focus positions and an image obtained by focus-stacking these images are stored together with the respective depths of field. Then, based on the object distance of an area designated by a user and the depth of field of each image, at least two images having different depths of field are presented to the user. This allows the user to select a desired image, and thus an image having the depth of field which reflects the user's preference can be recorded.

Figure 14B:
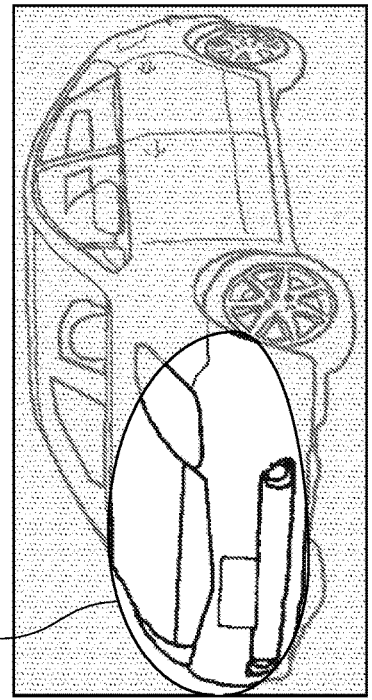
FIG. 14B is an example of a desired image according to the first embodiment.
Figure 14C:
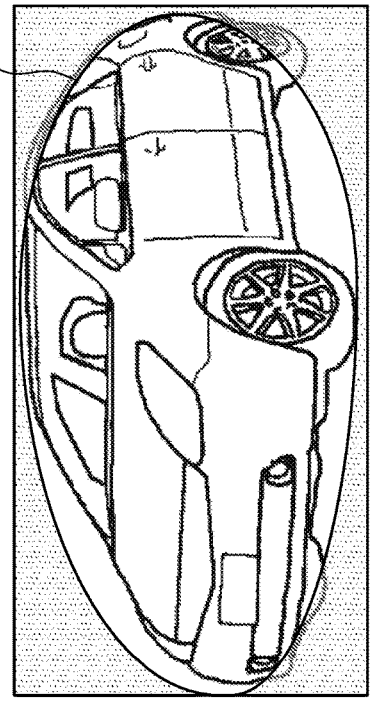
FIG. 14C is an example of a desired image according to the first embodiment.
Figure 14A:
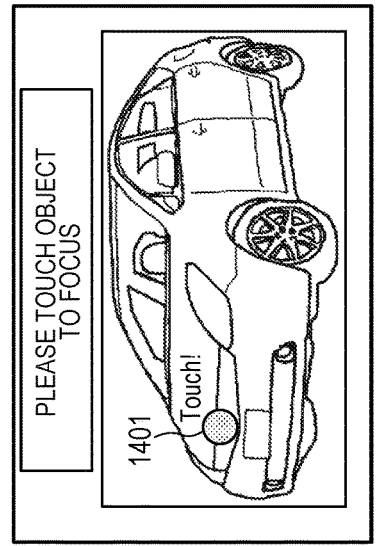
FIG. 14A is an example of an image for accepting designation according to the first embodiment.

FIG. 14A is an example of an image for accepting designation according to the present embodiment. It is assumed that a front portion 1401 of an automobile is designated by a user's touch operation. In this case, while it is considered that an image A, which is in focus only at an area 1402 close to the front portion of the automobile as illustrated in FIG. 14B, is desired, it is also considered that an image B, which is in focus at the entirety 1403 of the automobile as illustrated in FIG. 14C, is desired. Although, in general, it is difficult to determine which of the image A or B the user desires, an image actually reflecting the user's intention can be acquired by leaving a final decision to the user according to the present embodiment.

Second Embodiment

While it is expected in the first embodiment that the user designates a single point on an image for accepting designation, it is assumed in the present embodiment that designation by the user is not necessarily to a single point. Features that are different from those in the first embodiment will be mainly described below.

Figure 15:
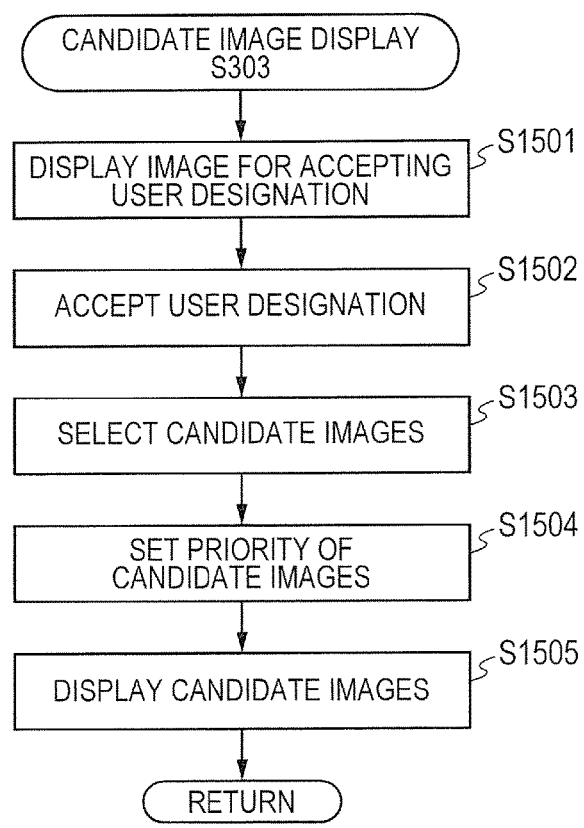
FIG. 15 is a flowchart of a candidate image display process according to a second embodiment.
Figure 16A:
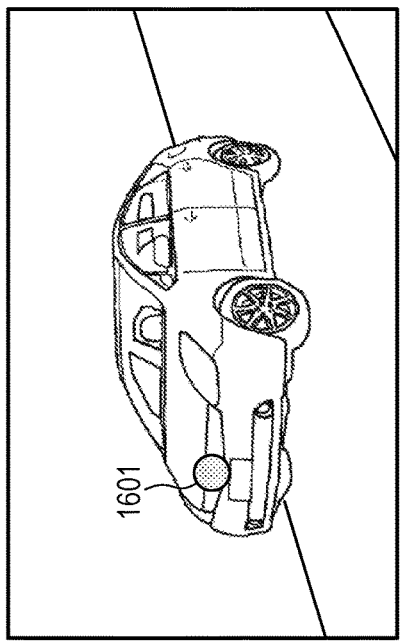
FIG. 16A is a diagram illustrating a relationship between a type of a touch operation and a user preference according to the second embodiment.
Figure 16B:
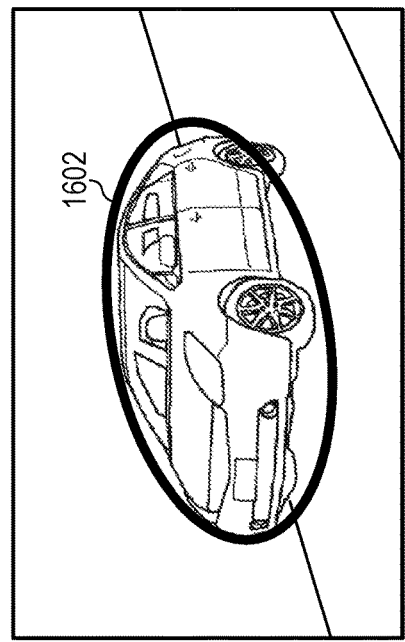
FIG. 16B is a diagram illustrating a relationship between a type of a touch operation and a user preference according to the second embodiment.

FIG. 15 is a flowchart of a candidate image display process according to the present embodiment. First, at step S1501, the image presentation unit 115 display an image for accepting designation on the display unit 108 as illustrated in FIG. 16A and FIG. 16B.

At step S1502, the image presentation unit 115 accepts designation from a user. When the front portion of the automobile is touched by the user as illustrated in FIG. 16A, the image presentation unit 115 receives coordinates of the touch point 1601 from the touch sensor 108a. Further, when the user performs a touch operation so as to encircle the entire automobile, which is an object, as illustrated in FIG. 16B, the image presentation unit 115 receives all the coordinates of the touch points from the touch sensor 108a, that is, a trace 1602 of the touch points.

At steps S1503 and S1504, the image presentation unit 115 selects candidate images and sets a priority of the candidate images. The image presentation unit 115 sets the priority based on the type of touch operation performed by the user. For example, as illustrated in FIG. 16A, when one point on the object is designated (at pinpoint designation), the image presentation unit 115 determines that an image which is in focus around the designated position only is likely to be desired by the user. On the other hand, as illustrated in FIG. 16B, when designation is made so as to encircle the entire object (at encircling designation), the image presentation unit 115 determines that an image which is in focus at the entire object is likely to be desired by the user The image presentation unit 115 reflects such the level of likelihood to the priority in presenting candidate images. For example, as FIG. 12B and FIG. 16A, when only one point of an object is designated, the image presentation unit 115 selects the image 1, the image 5, and the image 6 as candidate images and sets the priority of presenting the image 1 to the highest. In contrast, as illustrated in FIG. 16B, when designation is made so as to encircle the entire object, the image presentation unit 115 sets a higher priority to presentation of the image 5 and the image 6. That is, the priority in presenting candidate images is set in accordance with the way of designation by the user.

At step S1505, the image presentation unit 115 displays candidate images on the display unit 108. The image presentation unit 115 displays candidate images according to the priority of presentation.

Figure 17B:
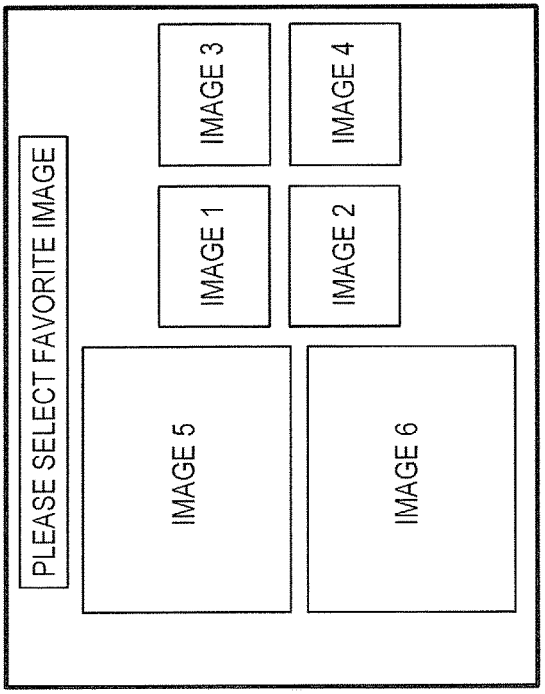
FIG. 17B is a diagram illustrating an example of a display of candidate images according to the second embodiment.
Figure 17A:
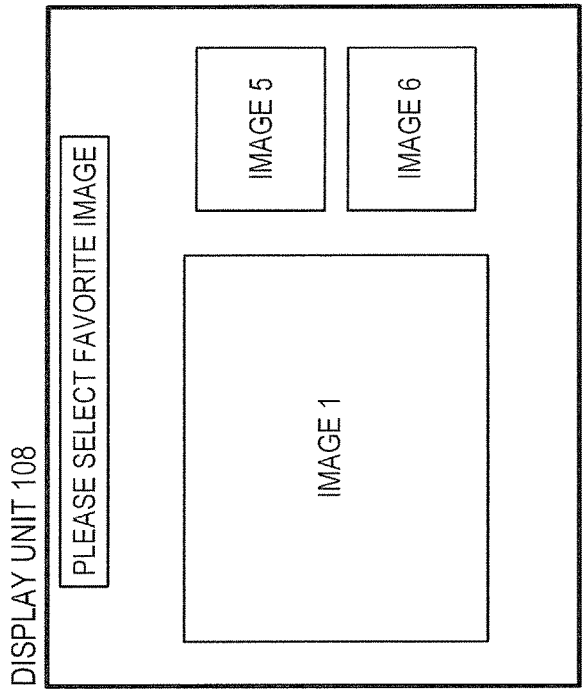
FIG. 17A is a diagram illustrating an example of a display of candidate images according to the second embodiment.

FIG. 17A and FIG. 17B are diagrams illustrating examples of a display of candidate images according to the present embodiment. FIG. 17A is an example display when the image 1 having a smaller depth of field is set to a high priority at pinpoint designation. On the other hand, FIG. 17B is an example display when the image 5 or the image 6 having a greater depth of field is set to a high priority at encircling designation. As illustrated in FIG. 17A and FIG. 17B, the image presentation unit 115 displays the image of the highest priority of presentation as the largest image.

As discussed above, according to the present embodiment, it is possible to estimate the user's preference based on the type of touch operation performed by the user and provide a priority of presentation to candidate images. A priority of presentation is reflected to the display method, which allows the user to more easily select an image matched to the preference.

Modified Embodiment

The present invention is not limited to the embodiments described above and various modification is possible. For example, in the embodiments described above, one combined image (image 6) is generated by focus-stacking four images (images 1 to 4) obtained by focus bracketing capturing. The combining method is not limited to the above, and a plurality of combined images having different depths of field may be obtained by focus-stacking images of any number of images and any combination of images.

Designation from the user is not limited to designation using touch operation, and other various schemes may be used such as designation using a cursor, for example.

As a method of reflecting a priority of image to a display in the second embodiment, while a method of differentiating the size of images has been described, other various schemes may be used such as reflecting a priority to the order of display, for example.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)TM), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-127850, filed Jun. 28, 2016, which is hereby incorporated by reference herein in its entirety.

What is claimed is:

1. An image processing apparatus comprising:
a processor; and
a memory storing a program which, when executed by the processor, causes the image processing apparatus to:
acquire a plurality of images having different depths of field for an object;
designate an area of the object in response to designation by a user;
select, from the plurality of images, at least two candidate images having the depths of field which include an object distance of the designated area;
present the candidate images on a display unit;
select at least one image from the candidate images in response to designation by the user; and
record the selected candidate image on a storage medium.

2. The image processing apparatus according to claim 1, wherein at least one of the plurality of images is generated by focus-stacking a plurality of images having different focus positions.

3. The image processing apparatus according to claim 1, wherein at least one of the plurality of images is captured at an aperture value that is different from an aperture value at which another image of the plurality of images is captured.

4. The image processing apparatus according to claim 1, wherein in designating the area of the object, the program, when executed by the processor, causes the image processing apparatus to determine the area by detecting a touch operation by the user.

5. The image processing apparatus according to claim 1, wherein the program, when executed by the processor, further causes the image processing apparatus to, when no candidate image is selected, present an alarm on the display unit.

6. The image processing apparatus according to claim 1, wherein the program, when executed by the processor, further causes the image processing apparatus to, when no candidate image is selected, present an image having the greatest depth of field among the plurality of images on the display unit.

7. The image processing apparatus according to claim 1, wherein the program, when executed by the processor, further causes the image processing apparatus to set a priority of presentation for the candidate images in response to designation by the user.

8. An image processing method comprising:
   acquiring a plurality of images having different depths of field for an object;
   designating an area of the object in response to designation by a user;
   selecting, from the plurality of images, at least two candidate images having the depths of field which include an object distance of the designated area;
   presenting the candidate images on a display unit;
   selecting at least one image from the candidate images in response to designation by the user; and
   recording the selected candidate image on a storage medium.

9. A non-transitory storage medium that stores in a computer readable manner a program for causing a computer to execute a following image processing method including:
   acquiring a plurality of images having different depths of field for an object;
   designating an area of the object in response to designation by a user;
   selecting, from the plurality of images, at least two candidate images having the depths of field which include an object distance of the designated area;
   presenting the candidate images on a display unit;
   selecting at least one image from the candidate images in response to designation by the user; and
   recording the selected candidate image on a storage medium.

* * * * *